April 29, 1958   O. C. WALLEY   2,832,926
RESISTANCE STARTING CONTROLLER FOR DIRECT CURRENT MOTORS
Filed Jan. 15, 1954   3 Sheets-Sheet 1

INVENTOR.
OMAR C. WALLEY
BY
ATTORNEY

April 29, 1958     O. C. WALLEY     2,832,926
RESISTANCE STARTING CONTROLLER FOR DIRECT CURRENT MOTORS Filed Jan. 15, 1954     3 Sheets-Sheet 2

INVENTOR.
OMAR C. WALLEY
BY
ATTORNEY

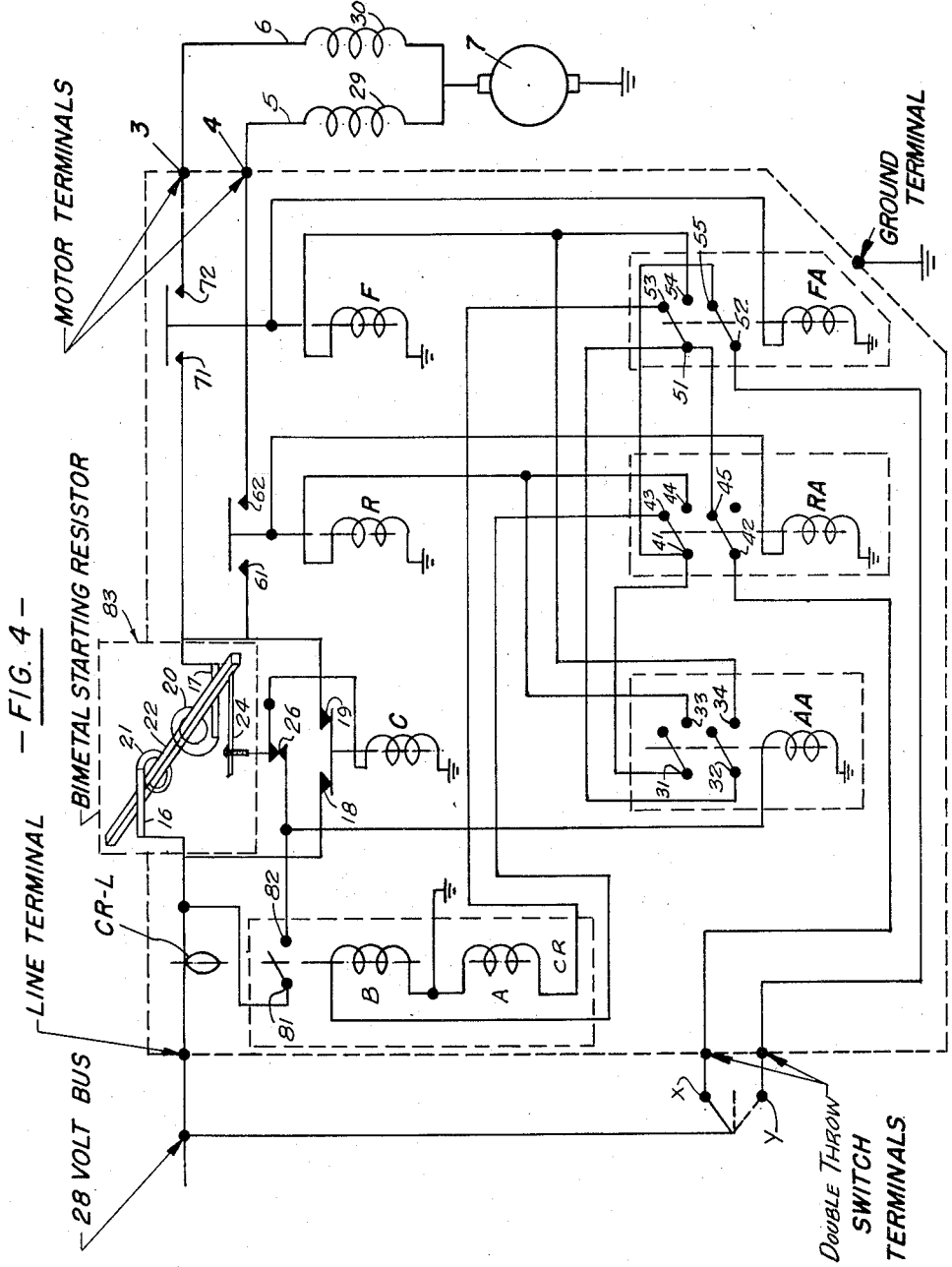

United States Patent Office 2,832,926
Patented Apr. 29, 1958

2,832,926

RESISTANCE STARTING CONTROLLER FOR DIRECT CURRENT MOTORS

Omar C. Walley, Cleveland, Ohio, assignor to Jack & Heintz, Inc., Cleveland, Ohio, a corporation of Delaware Application January 15, 1954, Serial No. 404,218

4 Claims. (Cl. 318—399)

This invention relates to starting controllers for electric motors and more particularly to resistance starting controllers for aircraft direct current series motors.

Conventional practice has been to start motors on aircraft with a simple contactor. On present day aircraft, certain motors draw excessive current during starting. This excessive current causes the aircraft electrical system voltage to decrease outside the desirable limits. This decrease in voltage has detrimental effects on other loads, such as the automatic pilot, lights and instruments.

One method of eliminating the excessive starting current is to insert resistance in series with the motor during starting. This added resistance limits the starting current to a value which can be tolerated on the aircraft electrical system. When adding such resistance on an aircraft controller, care must be taken to add a minimum of weight. The resistance element has a minimum weight when its thermal capacity is just enough so that overheating of the resistance element does not occur during a normal start. Providing a resistance element with a minimum of thermal capacity for normal conditions requires that a protective means be provided for abnormal conditions. An abnormal condition might be where the motor did not start, such as a locked rotor condition. The resistance element in this case is normally required to carry starting current for less than one-half second. When considering the short time of one-half second, it is clear to those experienced in the art that it is practically impossible to detect an excessive temperature by a separate unit such as a contact type thermal element where a heat transfer would have to be made.

It is therefore one of the primary objects of my invention to provide, in such a controller, a resistance element which will be capable of not only detecting overheating occurring therein but also capable of acting as the protection actuating device, without the necessity of employing a separate heat transfer unit.

In order to avoid the necessity of such a separate heat transfer unit, I propose to employ such a strip of bimetal that will act as both the resistance element and the protection actuating device. This resistance element is preferably wound and mounted in a special way to avoid the necessity of flexible cables and to avoid any unsupported end which would be subject to harmful vibration.

With the foregoing and other objects in view, the invention resides in the combination of parts and in the details of construction hereinafter set forth in the following specification and appended claims, certain embodiments thereof being illustrated in the accompanying drawings, in which:

Figure 4 is a circuit diagram of the starting controller system.

Figure 1:
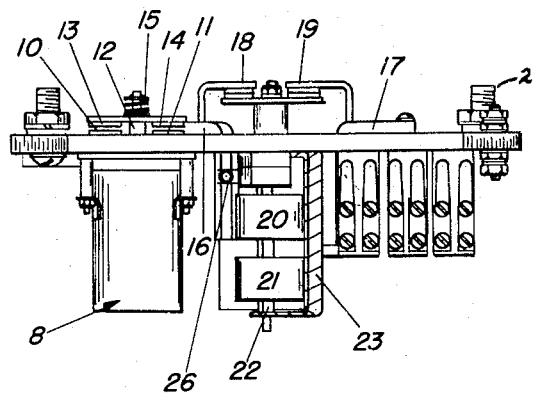
Figure 1 is a view in side elevation of the controller, with the controller circuit open.

Referring more particularly to the drawings, the controller is shown to include a base 1 for supporting a contact 2 leading to a direct current electric source and motor terminals 3 and 4 and leads 5 and 6 to a motor 7. It also includes a pair of solenoids, generally indicated at 8 and 9.

In Figure 1, the solenoid, or coil, 8, is shown to have contacts 10 and 11 and an armature 12 with contacts 13 and 14 normally maintained by an internal spring out of contact with contacts 10 and 11 to keep the controller circuit open. The base also carries a pair of spaced copper bars and with arms carrying contacts 18 and 19.

Figure 2:
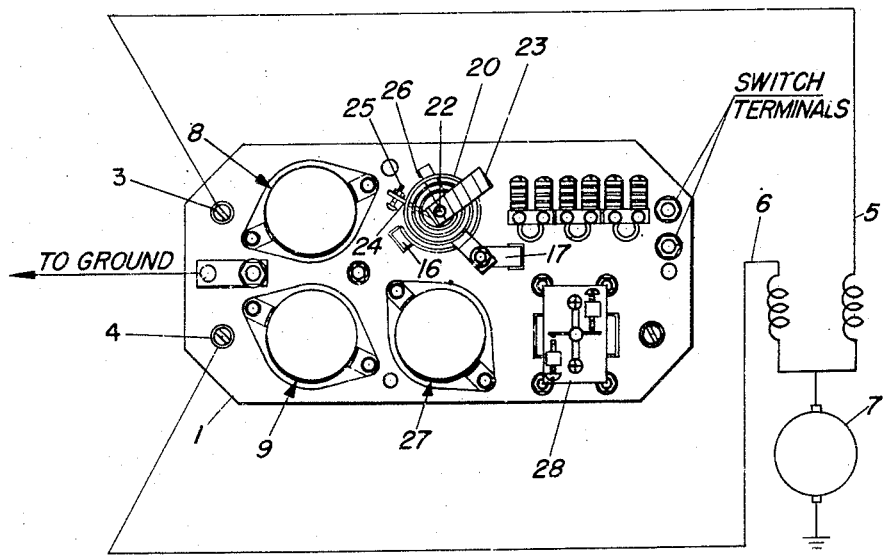
Figure 2 is a view in top plan of the same, showing the source and a split series reversible motor.
Figure 3:
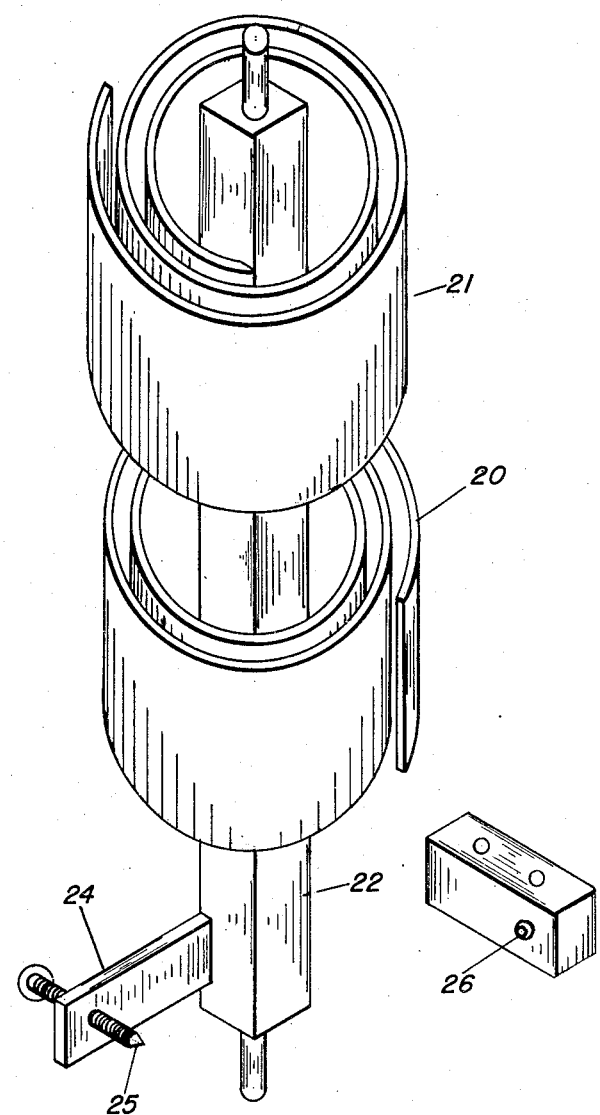
Figure 3 is a detail enlarged view in perspective of the resistance element including two wound coils of bimetal and their common shaft with the microswitch closed.

Referring to Figure 3, two coils 20 and 21, are wound from bimetal, and one end of each coil is attached to shaft 22 to form the resistance element. Looking at Figures 1 and 2, the other ends of the coils are connected in series with the motor 7 through the rigid copper bars, 16 and 17. The free end of the shaft 22 is supported by insulated bracket 23. Overheating of the resistance element causes the center shaft 22 to rotate through an angle. Lever 24, carrying an adjusting screw 25, is attached to the shaft and operates microswitch 26 when the element reaches a pre-determined maximum safe temperature. The microswitch is in the coil circuit of the starting, or accelerating contactor, generally indicated at 27. This contactor is spring actuated to normally have its armature urged upward to have the contacts 18 and 19 closed, as shown in Figure 1.

Consequently, when overtemperature is detected by the bimetal resistor, the accelerating contactor is locked out, causing a short circuit across the starting resistor. Thus, inherent overtemperature protection is provided. Moreover, by the use of a simple bimetal unit, I detect overheating and protect against it. No flexible leads are required and hence the unit is not subject to damage from vibration usually encountered in aircraft applications.

Upon initiating the starting cycle, current from the source causes coil of solenoid 8, or coil of solenoid 9, depending on the direction of rotation desired, to be energized so as to draw the armature 12 downwardly to close contacts away from their open position of Figure 1 against the action of the spring. This completes the circuit from the source through the accelerating contactor to the motor.

With reference to the circuit diagram of Figure 4, in order to provide for forward operation of the motor, the double throw switch is thrown to position X, as shown in full lines, as contrasted to the dotted lines of position Y. The voltage coil A of relay CR is energized through normally closed contacts 42 and 45 of relay RA and 51 and 53 of relay FA, closing normally open contacts 81 and 82 of relay CR. When contacts 81 and 82 close, accelerating contactor C is energized through the normally closed contacts of microswitch 26, opening normally closed contacts 18 and 19 of contactor C and thus opening the circuit that normally shunts the bimetal starting resistor, indicated generally at 83 in Figure 4. Thus the bimetal starting resistor is inserted into the load current path to the motor 7. At the same time, the relay AA is also energized through contacts 81 and 82 of the relay CR, closing normally open contacts 32 and 34 of relay AA and thus energizing relay F. The energization of relay F closes its normally open contacts 71 and 72 completing the load current path from the direct current source through holding coil CR-L, bimetal starting resistor 83 to lead 6 and the forward operating field winding 30 of motor 7. Closing of contacts 71 and 72 of relay F also energizes relay FA, opening the connection between contacts 51 and 53 of and making a connection between contacts 51 and 54 of relay FA to energize relay F from switch position X through the contacts of relays RA and FA, and independent of the former path through relay AA. Operation of relay FA, by opening the circuit between contacts 51 and 53, also de-energizes coil A of relay CR. However, by this time, the starting current surge through coil CR-L holds contacts 81 and 82 of relay CR in the make position. When the starting current surge decreases as the motor accelerates, holding coil CR-L is sufficiently de-energized to permit contacts 81 and 82 of relay CR to open, causing relays AA and C to be de-energized. De-energization of the latter closes its contacts 18 and 19 closing the shunt circuit around the bimetal starting resistor 83 and effectively removing it from the load line to motor 7.

The reverse operation of the circuit is as follows:

The double throw switch is placed in the Y position to operate motor 7 in the reverse direction. The sequence of operations begins by energizing coil B of relay CR through the normally closed contacts 52 and 55 of the FA relay and contacts 41 and 43 of relay RA. Energization of coil B closes contacts 81 and 82 of relay CR energizing accelerating contactor C through the normally closed contacts of microswitch 26. Thereby the connection between contacts 18 and 19 is opened and thus also is opened the current path by-pass around the bimetal starting resistor and the bimetallic starting resistor, indicated in general at 83 in Figure 4, is inserted in the load line to motor 7. The closing of contacts 81 and 82 also energizes relay AA closing contacts 31 and 33 in the reverse operation current path energizing coil R which causes its armature to connect contacts 61 and 62 completing the load current path from the direct current source through the holding coil CR-L and the bimetal starting resistor 83 to lead 5 and reverse operation winding 29 of motor 7. Connection of contacts 61 and 62 allows current from the load line to energize coil RA which closes normally open contacts 41 and 44 providing a current path from the direct current source through Y position of the double throw switch, through relay FA and relay RA to ground through relay R independent of its former path through contacts 31 and 32 of relay AA. Closure of contacts 41 and 44 disconnects the energizing current to coil B. The control of normally open contacts 81 and 82 and thus the energizing of coil C is then dependent upon the starting current surge through loop CR-L. As soon as the starting current surge through holding coil CR-L decreases, contacts 81 and 82 return to their normally open position de-energizing coils AA and C. De-energization of coil C connects contacts 18 and 19 re-establishing the shunt around the bimetallic starting resistor 83 and effectively removing it from the load line to the reverse field coil 29 of the motor 7.

In either forward or reverse operation, if for any reason contacts 81 and 82 of relay CR fail to open, thus leaving the resistor 83 in the motor circuit, and if the flow of current through the resistor is great enough and continues long enough to cause the temperature of the bimetal elements 20 and 21 to reach the predetermined maximum safe temperature, the shaft 22 is rotated and opens the microswitch. This de-energizes the accelerating contactor C and closes contacts 18 and 19, thus effectively protecting the starting resistor against unduly large or prolonged motor currents regardless of the action of coil CR-L.

When the motor is inched, there might exist a possibility of burning up the starting resistor. This is because the resistor is always inserted in the circuit before power is applied to the motor, regardless of the motor speed at the time. In order to prevent the destruction of the resistor, I have provided the hereinabove described new and novel resistor, employing two bimetal spirals 20 and 21 in series wound on a shaft. As previously explained, when the temperature of the resistor reaches the maximum safe limit, the shaft 22 rotates far enough for lever 24 to trip microswitch 26. Operation of this microswitch breaks the C coil circuit so as to lock out the resistor.

I claim:

1. In combination with a motor, an electrical source, a resistor including a temperature responsive bi-metal element which is electrically in series with the motor, a switch and an operative connection between said switch and said bimetal element, a contactor having normally closed contacts connected across said resistor, circuit means to energize said contactor to open said contacts to open said shunt circuit and cause current to flow through said resistor upon initiation of the starting cycle of the motor and to de-energize said contactor to close said contacts and shunt out said resistor after the starting current to said motor has fallen to a predetermined value, said temperature responsive bimetal element upon occurrence of a predetermined temperature therein being adapted to detect and protect itself against said temperature by operating said switch through said operative connection to open the circuit therethrough, thereby de-energizing said contactor and closing said contacts thereby to shunt said resistor out of circuit as long as said predetermined temperature fails to decrease.

2. In a resistance starting controller for a direct current motor, an electrical source, a starting resistor including a pair of temperature responsive coils of bimetal which are in series with the motor, a shaft secured to one end of each of said coils and rotatable thereby, a microswitch and means carried by said shaft adapted to engage said microswitch to actuate the same, a normally de-energized coil in circuit with said source and energized upon initiating the motor starting cycle to close the circuit from said source through said starting resistor to said motor, an accelerating contactor having normally closed contacts connected across the starting resistor, circuit means for energizing said accelerating contactor upon initiating the motor starting cycle to open said contacts and thereby cause the motor starting current to flow through said starting resistor and for opening the circuit through said accelerating contactor upon reduction of the motor starting current to a predetermined value thereby to close the contacts across the starting resistor and to shunt the starting resistor effectively out of the motor circuit, said temperature responsive bimetal coils upon occurrence of a predetermined temperature therein being adapted to detect and protect against said temperature by rotating said shaft to operate said microswitch to open the circuit to said accelerating contactor, thereby causing the normally closed contacts thereof to close and to create a shunt across said starting resistor.

3. In a resistance starting controller for a direct current motor, an electrical source, a starting resistor including a temperature responsive bimetal element which is in series with the motor, a switch and an operative connection between said switch and said bimetal element, a normally de-energized coil in circuit with said source and energized upon initiating the motor starting cycle to close the circuit from said source through said starting resistor to said motor, an accelerating contactor having normally closed contacts connected across the starting resistor, circuit means for energizing said accelerating contactor upon initiating the motor starting cycle to open said contacts and thereby cause the motor starting current to flow through said starting resistor and for opening the circuit through said accelerating contactor upon reduction of the motor starting current to a predetermined value thereby to close said contacts across the starting resistor and to shunt the starting resistor effectively out of the motor circuit, said temperature responsive bimetal element upon occurrence of a predetermined temperature therein being adapted to detect and protect itself against said temperature by operating said microswitch to open the circuit to said accelerating contactor, thereby causing the normally closed contacts thereof to close and to create a shunt across said starting resistor regardless of the value of the motor starting current.

4. In a resistance starting controller for an electric motor, a starting resistor including a bimetallic resistance element which is electrically in series with the motor, said temperature responsive bimetallic element having one end fixed and the other end movable, a switch and means operatively connected to the movable end of said temperature responsive bimetallic element adapted to open said switch upon an increase in the temperature of said starting resistor above a predetermined value, a circuit constituting a shunt around said starting resistor, an accelerating contactor having normally closed contacts in said shunt circuit, circuit means for energizing said accelerating contactor to open said shunt circuit upon initiation of the starting cycle of said motor and for de-energizing said accelerating contactor upon a normal reduction in the motor starting current consequent upon acceleration of the motor whereby to close said shunt circuit, said switch being included in the circuit to said accelerating contactor and being arranged to open the circuit to the acclerating contactor upon an increase in the temperature of said bimetallic resistor above said predetermined value, thereby to close said shunt circuit and effectively cut said resistor from the motor circuit.

References Cited in the file of this patent

UNITED STATES PATENTS

| 2,069,516 | Baker | Feb. 2, 1937 |
| 2,185,130 | Morrill et al. | Dec. 26, 1939 |